United States Patent
Rigaldies et al.

(10) Patent No.: US 9,036,619 B2
(45) Date of Patent: May 19, 2015

(54) SYSTEMS AND METHODS FOR A SESSION INITIATION PROTOCOL (SIP) TRANSLATOR

(75) Inventors: Bertrand Rigaldies, Earlysville, VA (US); Debbie Elliott, Crozet, VA (US); Wayne LaFleur, Barboursville, VA (US); Dan Priamo, Charlottesville, VA (US); Murad Sarp, Charlottesville, VA (US); Bruce Zenone, Nellysford, VA (US)

(73) Assignee: Mist Silicon Limited Liability Company, Wilmington, DE (US)

( * ) Notice: Subject to any disclaimer, the term of this patent is extended or adjusted under 35 U.S.C. 154(b) by 2247 days.

(21) Appl. No.: 11/129,576

(22) Filed: May 16, 2005

(65) Prior Publication Data

US 2006/0256774 A1 Nov. 16, 2006

(51) Int. Cl.
*H04L 12/66* (2006.01)
*H04L 29/06* (2006.01)

(52) U.S. Cl.
CPC ........ *H04L 29/06027* (2013.01); *H04L 65/104* (2013.01); *H04L 65/1006* (2013.01); *H04L 65/103* (2013.01)

(58) Field of Classification Search
CPC . H04L 65/103; H04L 65/104; H04L 65/1006; H04L 29/06027
USPC .......................................................... 370/352
See application file for complete search history.

(56) References Cited

U.S. PATENT DOCUMENTS

| | | | | |
|---|---|---|---|---|
| 7,529,269 | B1* | 5/2009 | Bhat et al. | 370/466 |
| 2002/0018464 | A1* | 2/2002 | Kikinis | 370/352 |
| 2002/0110113 | A1* | 8/2002 | Wengrovitz | 370/352 |
| 2002/0110117 | A1* | 8/2002 | Nishizaki | 370/352 |
| 2002/0112073 | A1* | 8/2002 | MeLampy et al. | 709/240 |
| 2002/0126654 | A1* | 9/2002 | Preston et al. | 370/352 |
| 2002/0143874 | A1* | 10/2002 | Marquette et al. | 709/204 |
| 2003/0021290 | A1* | 1/2003 | Jones | 370/466 |
| 2003/0023730 | A1* | 1/2003 | Wengrovitz et al. | 709/227 |
| 2003/0055974 | A1* | 3/2003 | Brophy et al. | 709/227 |
| 2003/0063623 | A1* | 4/2003 | Leslie et al. | 370/466 |
| 2003/0076815 | A1* | 4/2003 | Miller et al. | 370/352 |
| 2003/0133558 | A1* | 7/2003 | Kung et al. | 379/215.01 |
| 2004/0047342 | A1* | 3/2004 | Gavish et al. | 370/352 |
| 2005/0213537 | A1* | 9/2005 | Ingimundarson et al. | 370/329 |

OTHER PUBLICATIONS

M. Handley et al., *SIP: Session Initiation Protocol*, Network Working Group, Request for Comment ("RFC") 2543, Mar. 1999, pp. 1-153, published by The Internet Society.

* cited by examiner

*Primary Examiner* — Sonia Gay
(74) *Attorney, Agent, or Firm* — Sterne, Kessler, Goldstein & Fox P.L.L.C.

(57) ABSTRACT

A communications network element that includes a call processing software module that provides call processing and services and a session initiation protocol ("SIP") translator that translates SIP messages to instructions recognizable by the call processing software module and translates instructions from the call processing software module to SIP messages is provided. The SIP translator includes a SIP dialog module that receives SIP messages from endpoints and creates SIP dialog objects that represent an SIP endpoint; a SIP task module that coordinates the SIP translator events and exchange of messages; and a translator dialog module that translates SIP messages and call processing software module instructions and creates translator dialog objects. Methods for translating SIP and call processing software module instructions are also provided. Methods for dynamically allocating gateway channels to couple SIP endpoints and legacy telephones are also provided.

26 Claims, 15 Drawing Sheets

SYSTEMS AND METHODS FOR A SESSION INITIATION PROTOCOL (SIP) TRANSLATOR

BACKGROUND OF THE INVENTION

1. Field of the Invention

The invention relates to communications, and more particularly to multi-media communications over Internet Protocol ("IP").

2. Background Art

Session Initiation Protocol ("SIP") is a protocol that allows two or more parties on an Internet Protocol ("IP") network to engage in multimedia sessions. SIP is a media agnostic protocol that allows any media, such as text, voice, video or any combination to be exchanged between parties.

SIP features and operations are described in Internet Engineering Task Force ("IETF") Request for Comment ("RFC") 2543, *SIP: Session Initiation Protocol*. In general, SIP is an application-layer control protocol that can establish, modify and terminate multimedia sessions. In the voice context, a session using SIP can be considered a call.

These multimedia sessions include multimedia conferences, distance learning, Internet telephony, such as voice over Internet Protocol ("VOIP") and similar applications. SIP can invite both persons and devices, such as media storage service devices to participate in a session or call. SIP can invite parties to both unicast and multicast sessions. SIP can be used to initiate sessions as well as invite members to sessions that have been advertised and established by other means.

The SIP protocol provides a robust signaling protocol that takes advantage of the growing availability of IP networks, such as the Internet and other wide and local area networks often used within corporate communication networks. An implementation challenge associated with the SIP Protocol is how to effectively integrate the use of the SIP protocol with existing telecommunications switches, including private branch exchanges ("PBXs") and other network elements.

Many existing communications network elements have call processing software modules that provide call setup and feature control based on traditional signaling, such as multi-frequency ("MF"), dual tone multi-frequency ("DTMF"), Integrated Services Digital Network ("ISDN") and Signaling System 7 ("SS7"), found in public switched telephone networks ("PSTN") that support plain old telephone service ("POTS") and advanced services often associated with PBXs and business services. These call processing software modules are sophisticated and have evolved over many years of use and development to eliminate software glitches and optimize performance. They support a multitude of call setup processes, call services and call feature interactions. Furthermore, end user customers have come to rely on many of the call features supported by traditional signaling methods. Developing entirely new call processing software modules to support the SIP protocol would not effectively utilize the years of development of existing call processing software modules, particularly when a network element must continue to support legacy telephones and SIP endpoints, which may include IP telephones, computers and other communications devices.

What are needed are systems and methods that can effectively use proven call processing software modules, while supporting and integrating the SIP protocol.

BRIEF SUMMARY OF THE INVENTION

A communications network element, for example, a private branch exchange ("PBX"), that includes a call processing software module that provides call processing and services and a SIP translator that translates SIP messages to instructions recognizable by the call processing software module and translates instructions from the call processing software module to SIP messages is provided. The SIP translator includes a SIP dialog module that receives SIP messages from endpoints and creates SIP dialog objects that represent an SIP endpoint; a SIP task module that coordinates the SIP translator events and exchange of messages within the SIP translator; and a translator dialog module that translates SIP messages and call processing software module instructions and creates translator dialog objects.

In an embodiment of the invention, a method to process SIP messages received by a communications network element having a call processing software module is provided. The method includes translating the SIP messages to one or more call processing software module instructions, response SIP messages and messages to reserve media gateway channels for connecting SIP and legacy telephones.

In another embodiment of the invention, a method a method to process instructions generated by a call processing software module in a communications network element when a connection to a SIP endpoint is involved is provided. The method includes translating call processing software module instructions to SIP messages, response instructions to the call processing software module and messages to reserve media gateway channels for connecting SIP and legacy telephones.

In a further aspect of the invention, a method to couple a legacy telephone circuit or trunk to a SIP endpoint channel within a communications network element is provided. The method provides for dynamically allocating, maintaining and releasing media gateway channels within a switch fabric to couple a SIP endpoint to a legacy telephone circuit or trunk.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
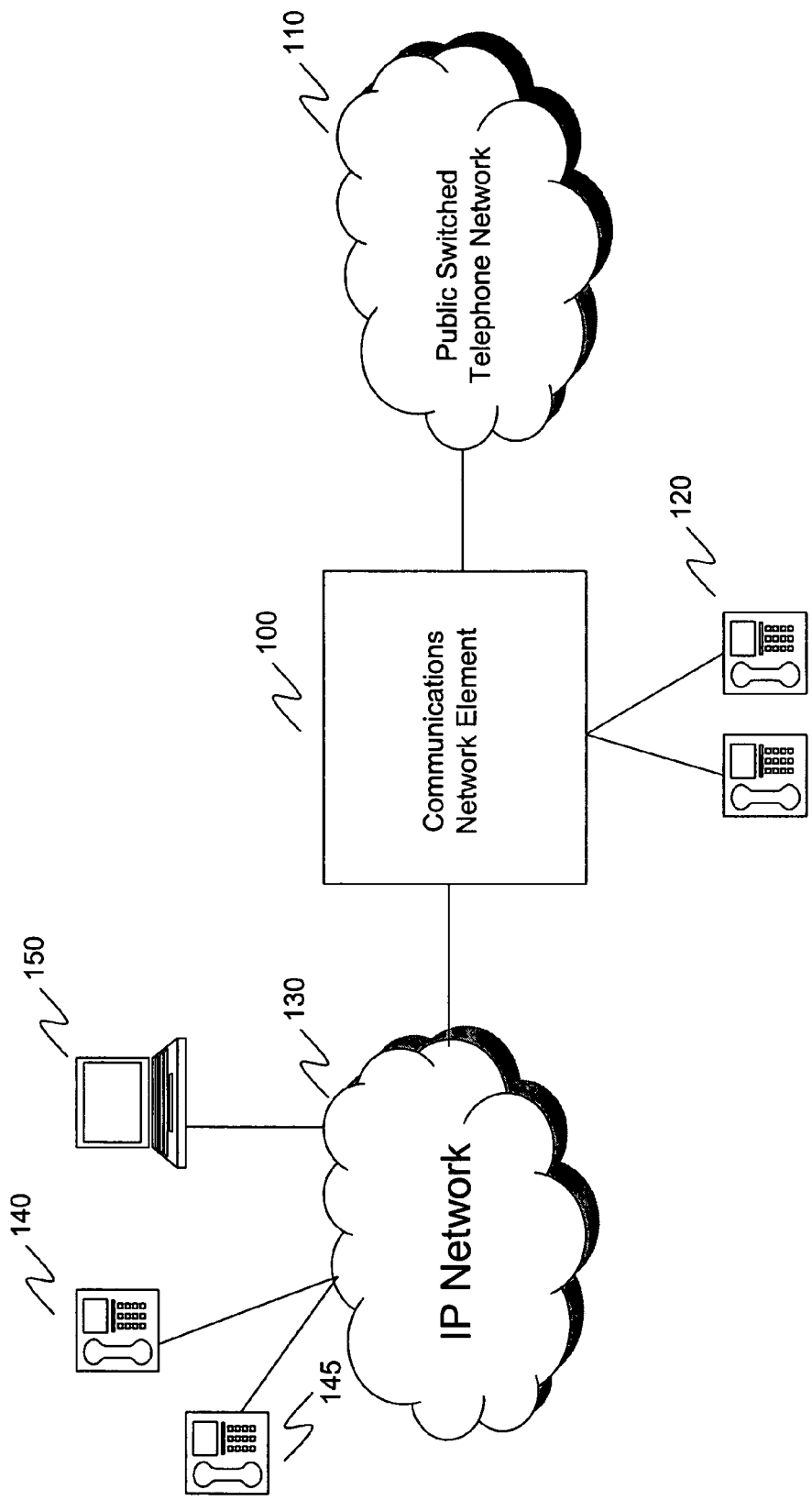
FIG. 1 is a simplified network diagram of a hybrid communication network involving both a PSTN and an IP network.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1 is a simplified network diagram of a hybrid communication network involving both a traditional public switched telephone network ("PSTN") 110 and an Internet Protocol ("IP") network 130. Such hybrid communication networks are increasingly commonplace as voice over Internet protocol ("VOIP") has become more widespread. Within the hybrid communication network, communications network element 100 provides connectivity between PSTN 110 and IP network 130. Communications network element 100 can represent, but is not limited to, an end office telecommunications switch, a private branch exchange ("PBX"), including an IP-PBX, soft switch, and the like. Communications network element 100 has trunks connected to PSTN 110 and lines that connect to legacy telephones, such as legacy telephone 120.

Legacy telephone 120 represents a non-SIP based phone, such as, for example, a POTS telephone used by a residential customer involving multi-frequency or ISDN signaling, or a PBX telephone coupled to a PBX involving multi-frequency, ISDN or some other proprietary signaling mechanism. The PBX telephone will typically support a robust set of services, such as, but not including support for sophisticated features such as hold, park, transfer, conferencing ("ad-hoc" and "meet-me"), presence management (i.e., to see whether a telephone line is busy), call coverage such as hunt groups, and the like.

Additionally, communications network element 100 has channels coupled to IP network 130. IP network 130 provides IP connectivity to SIP endpoints, such as SIP-based telephones 140 and 145, and personal computer 150.

Historically, communications network element 100 only needed to support PSTN 110 and legacy telephones, such as legacy telephone 120. Sophisticated call processing software modules were developed to support a plethora of call services and features, as well as basic call setup. As call services, such as call waiting and call forwarding, for example, proliferated these call processing software modules became extremely complex. This is particularly true in PBXs that support corporate communications and have many complex features, such as call conferencing, various follow-me type services and specialized call transfer features. Hundreds of man-years of software development and debugging went into the call processing software modules to ensure efficient operation and that service and feature interactions worked correctly.

With the growing use of the SIP protocol, switch manufacturers have been confronted with how best to integrate SIP protocol into their existing call processing software modules. Specifically, with respect to PBXs, the challenge is how to enable the PBX call processing features to both packet— (e.g., SIP) and legacy telephones while providing a consistent feature behavior and interface to the end-user across the two types of telephones.

One possible method of addressing this challenge includes bringing complete SIP protocol awareness into the state and event processing within existing call processing software modules. Such an approach, however, leads to many detailed changes within existing call processing software modules that could jeopardize feature integrity and lead to unexpected processing results. Furthermore, even when no SIP endpoints are involved in a call, changes to the existing software could lead to failures and feature interoperability issues.

Another possible method to address how to integrate SIP protocol into existing call processing software modules could involve the use of function calls (or "hooks") placed in existing call processing software at both the call and feature control levels. These hooks would send messages to a SIP processor that would then interpret what was needed by involved SIP endpoints. While this method better protects the existing call processing software against changes, its higher level (call and feature level) connection to the system could cause too much coupling between the existing call processing software system and the SIP processor. This coupling means that the SIP processor would need to have logic for each feature that was to be supported by the network element. This, in turn, would lead to a relatively complex design with significant functional duplication that would be challenging to implement, maintain, and test. Furthermore, this approach would lead to a translator whose logic would be fragmented in many small pieces across the communications network element call processing software. In addition to high maintenance, the approach would also require a significant amount of work every time a new call processing feature is implemented.

The present invention describes a system and method to integrate SIP protocol into existing call processing software modules at the event and message level—rather than at the call or feature level. While the present invention can be used with any type of communications network element, the invention is particularly useful when used with PBXs because of their particularly sophisticated call feature sets.

Figure 2:
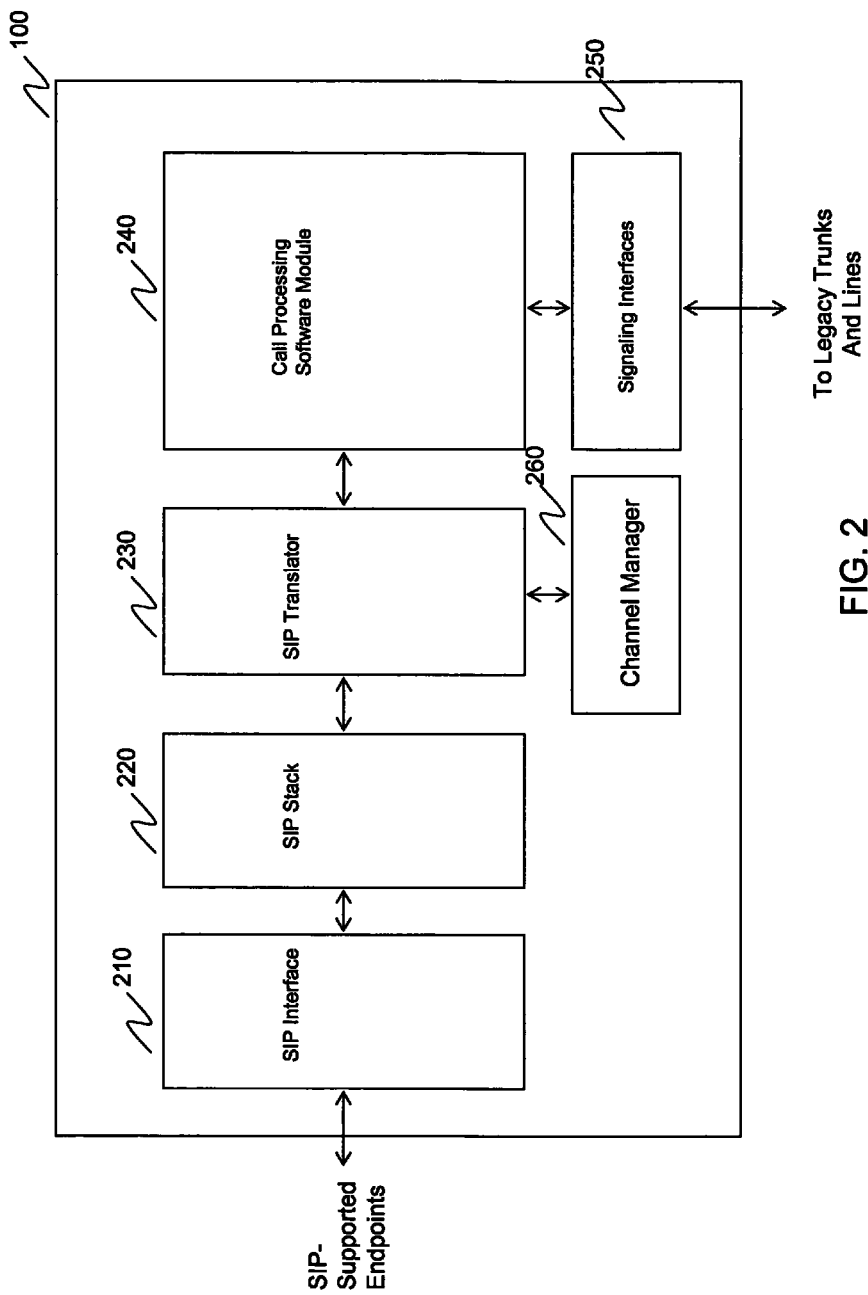
FIG. 2 provides a diagram of communications network element including a SIP translator, according to an embodiment of the invention.

FIG. 2 provides a schematic of communications network element 100, according to an embodiment of the invention. Communications network element 100 includes SIP interface 210, SIP stack 220, SIP translator 230, call processing software module 240, traditional signaling interfaces 250 and channel manager 260. SIP interface 210 is coupled to SIP endpoints through an IP network, such as the Internet, an Ethernet, or other local area and wide area networks. SIP interface 210 provides an interface between communications network element 100 and IP based networks.

SIP stack 220 is coupled to SIP interface 210 and queues SIP messages for processing by SIP translator 230 or for transmittal by SIP interface 210. SIP Stack 220 is also responsible for parsing incoming SIP messages as well as building outgoing SIP messages.

SIP translator 230 is coupled to SIP stack 220 and translates SIP messages to instructions recognizable by call processing software module 240. SIP translator 230 also translates call processing software module 240 instructions into SIP messages. Call processing software module 240 instructions include messages and instructions to support call features and services, such as basic call setup and enhanced services, such as call waiting, call forwarding, call transferring and the like. These instructions are messages that can be used by the call processing software module to implement call features and services. These instructions are contemplated to include control messages for establishing and maintaining future call services and features.

SIP messages are messages defined by the SIP protocol and include but are not limited to registration, call setup, call control, instant messaging and presence management related messages. The translations within SIP translator 230 occur at the message and event level, rather than the call or call feature level.

Call processing software module 240 represents the established software systems that switch manufacturers have developed through years of engineering and programming. Call processing software module 240 supports call set-up, features, and services. Commonly, mature switch design for PBXs and central office switches can support hundreds of call features and services.

Call processing software module 240 is also coupled to traditional signaling interfaces 250. Traditional signaling interfaces 250 represent line and trunk cards that are used to couple communications network element 100 to other PSTN switches and legacy telephones. The line and trunk cards can support various signaling protocols including multi-frequency, dual tone multi-frequency, ISDN and SS7.

Channel manager 260 allocates channels within communications network element 100 to couple SIP endpoint channels to legacy telephone lines and trunks. Historically, there was a one-one mapping of SIP endpoint channels to gateway channels used to connect a SIP endpoint channel with a legacy telephone circuit. This was an inefficient use of channels. Channel manager 260 addresses this inefficiency by dynamically allocating a gateway channel to a SIP endpoint channel that can then be coupled to a legacy telephone line or trunk circuit.

The traditional one-to-one mapping between a proprietary IP phone (SIP or other VoIP protocol) was a design that allowed the communications network element call processing software, such as the call processing software used by a PBX to be fooled into thinking that the IP phone resided at a given circuit time slot just like any other traditional circuit switched station or line. Doing so actually allowed the PBX to apply the majority, if not all, of its features to that type of IP phone. However, the cost of the design has been exorbitant for a large scale IP phone deployment. The present invention improves on existing approaches in terms of cost efficiency, while at the same time providing a software framework that supports a multitude of call features.

Figure 3:
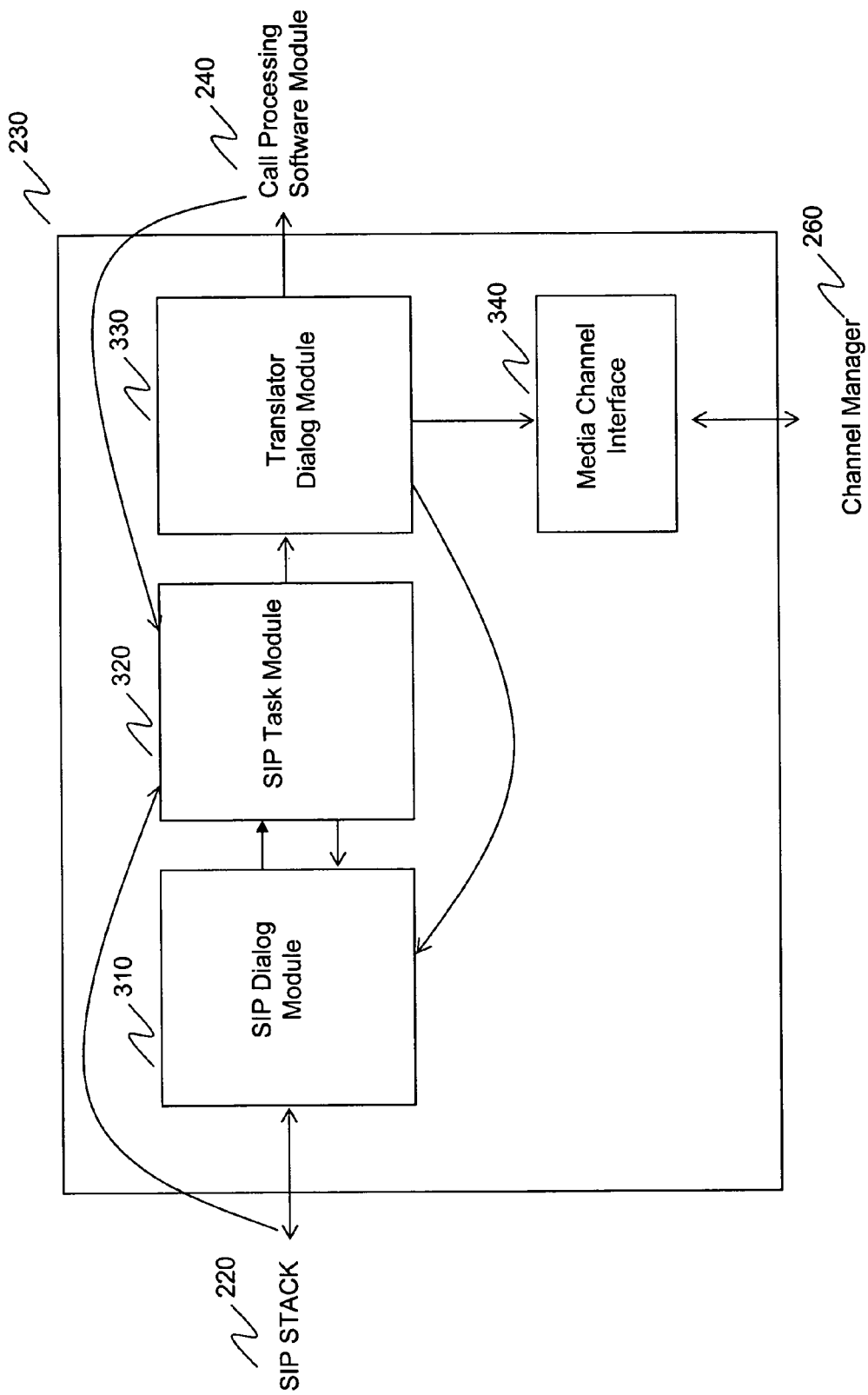
FIG. 3 provides a diagram of a SIP translator, according to an embodiment of the invention.

FIG. 3 provides a diagram of the SIP translator 230, according to an embodiment of the invention. SIP Translator 230 provides the call processing intelligence that allows the SIP protocol to be effectively integrated with call processing software module 240, without dramatically disturbing the software code of call processing software module 240. SIP translator 230 includes SIP dialog module 310, SIP task module 320, translator dialog module 330, and media channel interface 340.

When a SIP endpoint transmits a message to communications network element 100, SIP dialog module 310 receives SIP messages from SIP stack 220. SIP dialog module 310 dispatches the message to SIP Task module 320. When the SIP endpoint transmits its first message of a call session, often an INVITE message, this message passes directly to SIP task module 320. In this case, SIP task module 320 instructs SIP dialog module 310 to establish a SIP dialog object for that particular call. All subsequent messages will traverse the SIP dialog object established for the call session.

SIP task module 320 receives events from call processing software module 240 and from SIP dialog module 310. For example, SIP Task Module 320 can receive an indication that a switch connection has been made or that ringing has begun on a legacy telephone from call processing software module 240. Additionally, SIP Task Module 320 can receive an indication from SIP dialog module 310 that a SIP endpoint has provided a message.

SIP task module 320 also dispatches events to call processing software 240 and SIP dialog module 310. For example, SIP task module 320 can transmit an indication to call processing software module 240 that a SIP endpoint has gone on hook or off hook. Similarly, SIP task module 320 can transmit an indication, such as an INVITE or BYE message, to SIP dialog module 310 to indicate that a legacy telephone is placing a call or disconnecting a call to a SIP endpoint. In effect, SIP task module 320 coordinates the overall activity of SIP translator 230.

Translator dialog module 330 is a state-driven event handler. Translator dialog module 330 translates SIP messages and call processing software module instructions. Whenever a new call session occurs, translator dialog module 330 will create a translator dialog object for that particular call.

When a SIP message is received by the translator dialog object, a translation handler is called that translates the SIP message to one or more call processing software module instruction. In effect, SIP translator 230 is a state machine. Each state has a series of translation handlers, typically one translation per event. The translation handler performs some actions, and moves the state machine for the next state so that the next state is able to process future events based on the actions just performed.

For example, when an INVITE message is received, translator dialog module 330 translates the INVITE message to call processing software module instructions that include a directory number indication message and an offhook request message. These messages are transmitted to call processing software module 240, which interprets the messages to identify the telephone that is being called and to ring that particular telephone. The translation handlers can also include SIP response messages and commands to reserve, establish or disconnect a gateway channel. FIGS. 7A-10, which are discussed below, provide call flow diagrams for a number of example call scenarios to illustrate the use of SIP translator 230 and demonstrate various translations.

Similarly when an instruction is received from call processing software module 240, translator dialog module 330 translates the instruction to a SIP message. The translation handlers can also include response instructions to call processing software module 240 and commands to reserve, establish or disconnect a media gateway channel. FIGS. 7A-10, which are discussed below, provide call flow diagrams for a number of example call scenarios to illustrate the use of SIP translator 230 and demonstrate various translations.

Additionally, translator dialog module 330 handles the allocation of channels through media channel interface 340 if they are needed when a SIP endpoint communicates with a PSTN trunk or legacy telephone through call processing software module 240.

Media channel interface 340 communicates with channel manager 260 to establish an internal channel, referred to as a media gateway channel, within communications network element 100 to couple an IP channel associated with a SIP endpoint with a legacy telephone circuit or trunk. A media gateway channel is a conversion between voice packets on the IP network and circuit-switched voice inside a communications network element, such as a PBX. The conversion can be implemented with digital signal processing hardware, as will be known by individuals skilled in the relevant arts.

Figure 4:
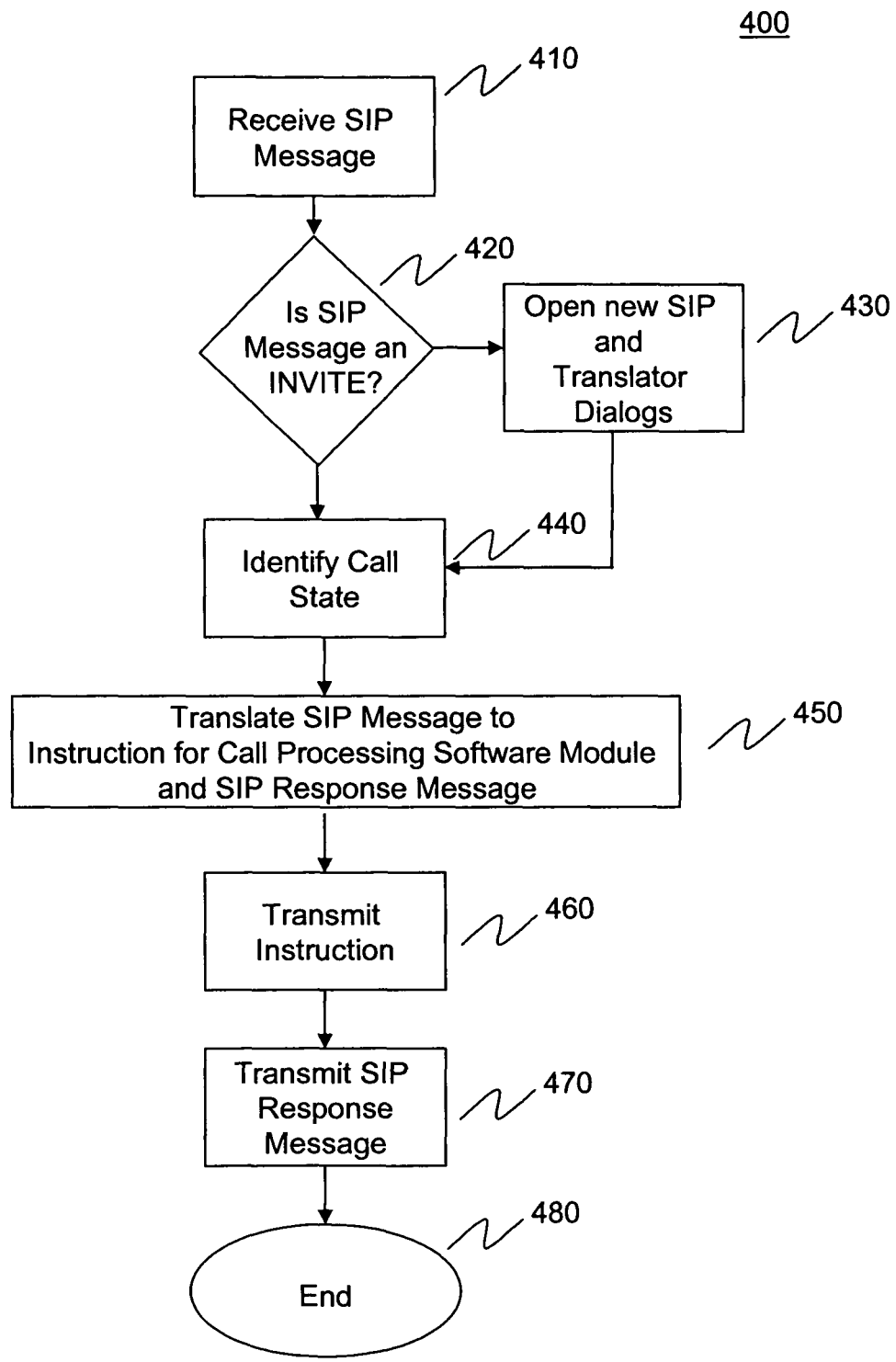
FIG. 4 is a flowchart of a method to process SIP messages received by a communications network element having a call processing software module, according to an embodiment of the invention.

FIG. 4 is a flowchart of method 400 to process SIP messages received by a communications network element having a call processing software module, according to an embodiment of the invention. Method 400 begins in step 410. In step 410 a SIP message is received. For example, SIP Task Module 320 can receive an INVITE message.

In step 420 a determination is made whether the message is an INVITE message. If the message is an INVITE message, method 400 proceeds to step 430 to open SIP and translator dialogs for the call. For example, SIP dialog module 310 can open a SIP dialog and translator dialog module 330 can open a translator dialog. The SIP dialog and translator dialog will remain open for the duration of the call session. The dialogs are used to track the events and messages within the call. The SIP dialog ensures that the appropriate messages are transmitted to the SIP endpoint, while the translator dialog is responsible for translating SIP messages to call processing software module 240 instructions and vice versa. When the SIP and translator dialogs are opened, method 400 proceeds to step 440. Similarly, if the SIP message is not an INVITE message, method 400 proceeds to step 440.

In step 440 a call state is identified. The call state determination is used to ensure that the appropriate translations are made. For example, depending on the state of a call, a particular SIP message may be translated to different instructions for call processing software module 240.

In step 450 a SIP message is translated to one or more call processing software module instructions. For example, translator dialog module 330 can translate an INVITE message to a directory number indication message and an offhook request message. Additionally, a response SIP message may also be generated.

In step 460 instructions to a call processing software module are transmitted. For example, translator dialog module 330 can transmit instructions to call processing software module 240.

In step 470 SIP response messages are transmitted. For example, translator dialog module 330 can transmit a SIP response message to SIP dialog module 310. In alternative embodiments, instructions can be provided to media channel interface 340 to reserve, establish and take down a gateway channel. These instructions can be included in the translation handlers associated with a particular signaling message. In step 480, method 400 ends.

Figure 5:
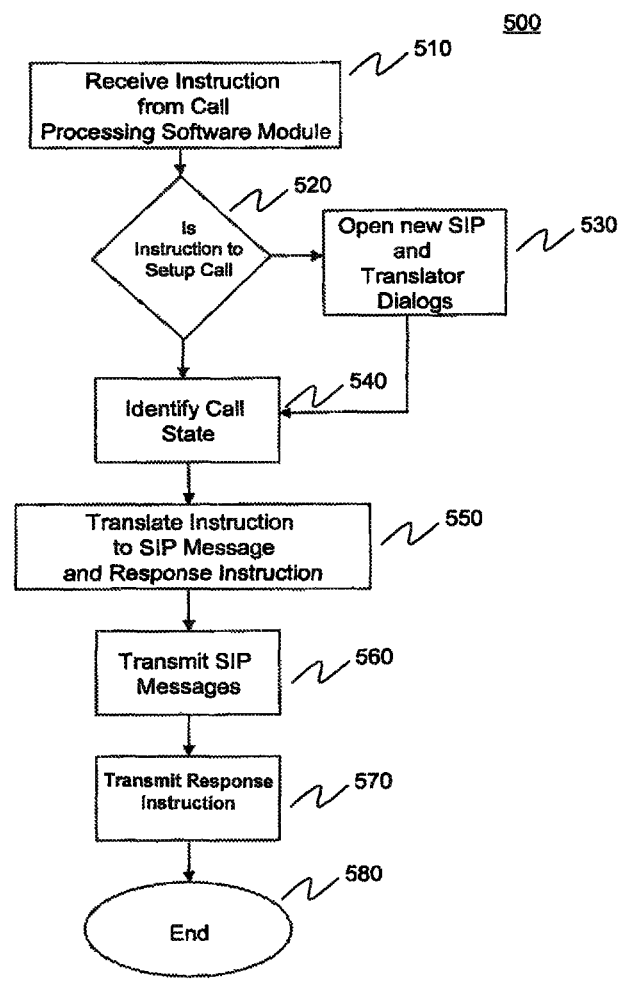
FIG. 5 is a flowchart of a method to process instructions generated by a call processing software module in a communications network element when a connection to a SIP endpoint is involved, according to an embodiment of the invention.

FIG. 5 is a flowchart of method 500 to process instructions generated by a call processing software module in a communications network element when a connection to a SIP endpoint is involved, according to an embodiment of the invention. Method 500 is a reverse translation method to method 400.

Method 500 begins in step 510. In step 510 an instruction from a call processing software module is received. For example, SIP Task Module 320 can receive an instruction fro a call processing software module that provides an indication to set up a call.

In step 520 a determination is made whether the message is an attempt to setup a new call. If a determination is made that a new call is being attempted to be setup, method 500 proceeds to step 530 to open SIP and translator dialogs for the call. For example, SIP dialog module 310 can open a SIP dialog and translator dialog module 330 can open a translator dialog. The SIP dialog and translator dialog will remain open for the duration of the call session. When the SIP and translator dialogs are opened, method 500 proceeds to step 540. Similarly, if the instruction message is not attempting to establish a new call, method 500 proceeds to step 540.

In step 540 a call state is identified. The call state determination is used to ensure that the appropriate translations are made. For example, depending on the state of a call, a particular instruction from call processing software module 240 may be translated to different SIP messages.

In step 550 the instruction from call processing software module 240 is translated to one or more SIP messages. For example, translator dialog module 330 can translate a request to establish a call into an INVITE message. Additionally, a response instruction to call processing software module 240 may also be generated.

In step 560 SIP messages are transmitted. For example, translator dialog module 330 can transmit SIP messages to SIP dialog module 310.

In step 570 response messages to a call processing software moduel are transmitted. For example, translator dialog module 330 can transmit a response instruction to call processing software module 240. In step 580, method 500 ends.

In alternative embodiments, instructions can be provided to media channel interface 340 to reserve, establish and take down a media gateway channel. These instructions can be included in the translation handlers associated with a particular signaling message.

When developing a communications network element that supports SIP endpoints and legacy telephones, another design consideration is the efficient use of internal channels within the switch fabric for coupling IP channels used for SIP endpoints to circuits used for legacy telephones. Early communications network elements tended to permanently allocate channels for each SIP endpoint that was supported. Such a scheme wasted valuable switch resources. Another aspect of the present invention includes a method to dynamically allocate internal channels, referred to as media gateway channels, within the communications network element as they are needed.

Figure 6:
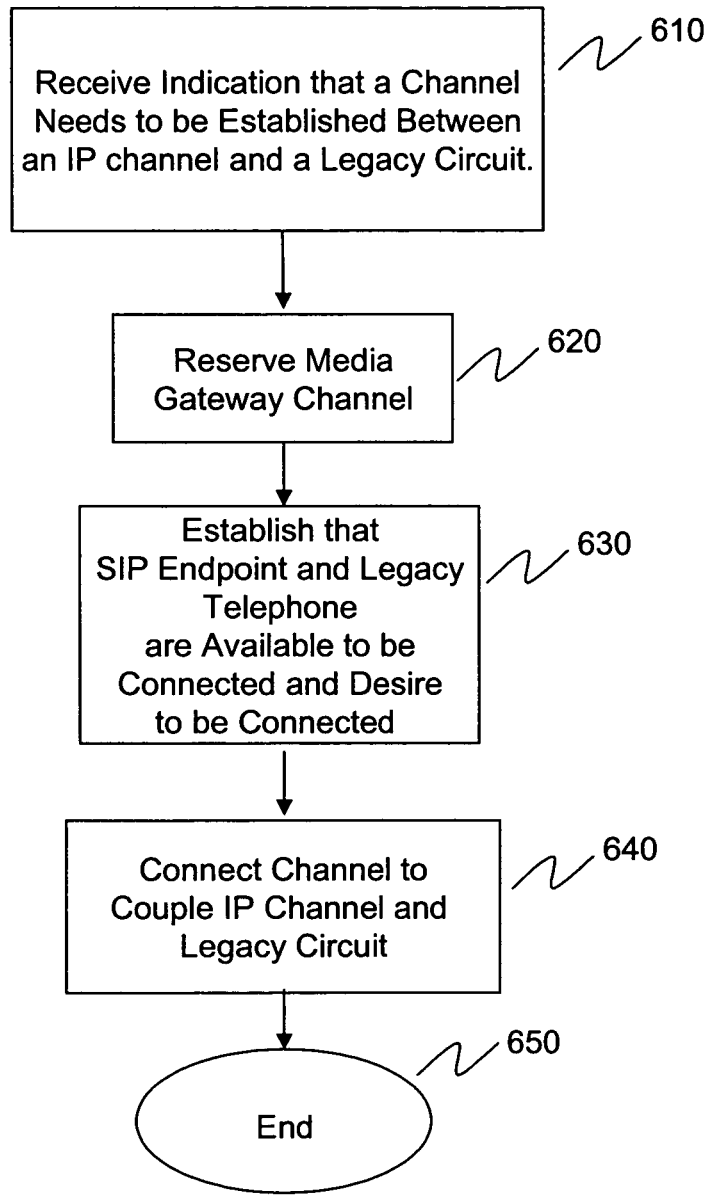
FIG. 6 is a flowchart of a method to couple a legacy telephone circuit or trunk to a SIP endpoint channel, according to an embodiment of the invention.

FIG. 6 provides a flowchart of method 600 to couple a legacy telephone circuit to a SIP endpoint channel, according to an embodiment of the invention.

Method 600 begins in step 610. In step 610 an indication is received that a channel needs to be established between an SIP endpoint IP channel and a legacy telephone circuit (e.g., line or trunk). For example, referring to FIG. 7, in step 716 an INVITE message is provided to translator dialog 704. Translator dialog A 704 recognizes that a call is trying to be established between a SIP endpoint and a legacy telephone. Therefore, translator dialog A 704 sends a get_channel message to media channel interface 340 to reserve a media gateway channel.

In step 620 a media gateway channel is reserved. For example, referring to FIG. 7, media channel interface 340 receives a get_channel request in step 720. In response to this message media channel interface 340 requests that channel manager 260 reserves a media gateway channel.

In step 630 the availability of the SIP endpoint and legacy telephone to be connected is determined. Additionally, a determination is made whether the SIP endpoint and legacy telephone desire to be connected. Referring to FIG. 7, these determinations are made through the signaling interactions that occur in step 720 through step 744.

Figure 7A:
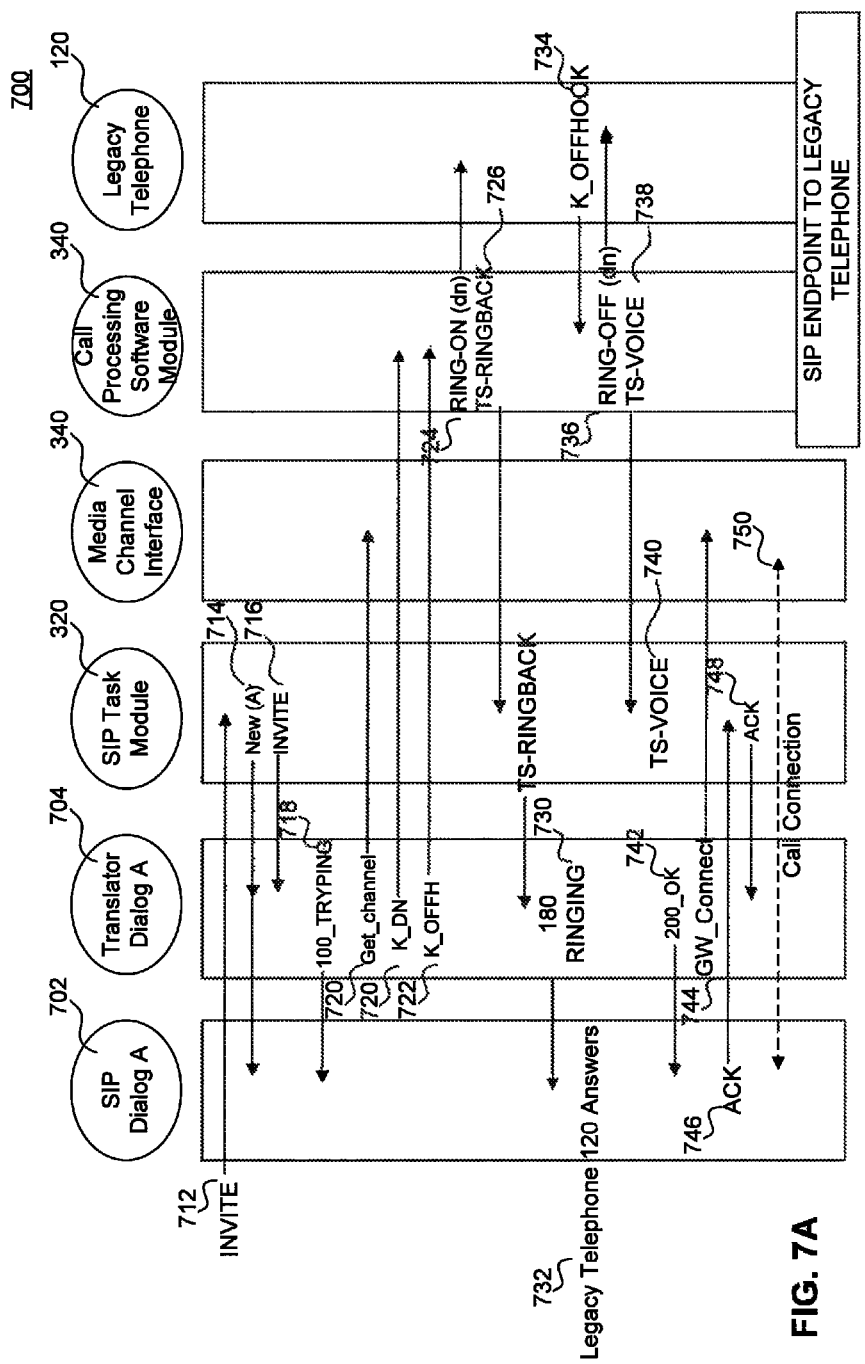
FIG. 7A is a call diagram for a call placed by a SIP endpoint to a legacy telephone, according to an embodiment of the invention.

In step 640 the IP channel supporting the SIP endpoint and legcy telephone circuit are connected. Referring to FIG. 7A, in step 744 translator dialog A 704 sends a GW_connect message to media channel interface 340. Upon receipt of this message, media channel interface 340 instructs channel manager 260 to connect the gateway channel that was reserved to the SIP endpoint IP channel and to the legacy telephone circuit to complete the connection. In step 650 method 600 ends.

When the call connection between the SIP endpoint and legacy telephone ends, the media gateway channel will be released. Referring to FIG. 7C, translator dialog A sends a GW_disconnect message to media channel interface 340 to inform media channel interface 340 that the media gateway channel should be released. This will typically occur after one party disconnects. Upon receipt of the GW_disconnect message, Media channel interface 340 requests that channel manager 260 release the media gateway channel, thereby freeing up the switch resources for other calls.

FIG. 7A provides a call diagram for a call placed by a SIP endpoint to a legacy telephone, according to an embodiment of the invention. The call diagram illustrates the operation of communications network element 100 having SIP translator 230, while providing examples of how methods 400, 500, and 600 can be implemented.

Call diagram 700 begins in step 712. In step 712 an INVITE message is received by SIP translator 230 from a SIP endpoint, for example, SIP endpoint 140. In step 712 the INVITE message is transmitted to SIP task module 320.

In step 714 SIP task module 320 instructs SIP dialog module 310 to establish a SIP dialog object, which is identified in FIG. 7A as SIP dialog A 702. Additionally, SIP task module 320 instructs translator dialog module 330 to establish a translator dialog object, which is identified in FIG. 7A as translator dialog A 704. These objects will remain through the duration of the call to track the events and provide translations as necessary. As will be understood by individuals skilled in the art, in order to support multiple simultaneous call connections, SIP translator 230 can simultaneously maintain many active SIP dialog and translator objects.

In step 716 SIP task module 320 transmits an INVITE message to translator dialog A 704. Upon receipt of the INVITE message translator dialog A 704 invokes a translation handler for the INVITE message based on the state of the call. The translation handler provides instructions to transmit a 100_TRYING message to SIP dialog A 702, which occurs in step 718. The translation handler also provides instructions to transmit a Get_channel message to media channel interface 340, which occurs in step 720. As explained above with respect to step 620 in method 600, the Get_channel message requests that media channel interface 340 reserves a media gateway channel within communications network element 100 for coupling a SIP endpoint channel to a legacy telephone circuit. Upon receipt of the Get_channel message, media channel interface 340 instructs channel manager 260 to reserve the appropriate switch resources for the channel (e.g., ports on line or trunk cards, CODEC selection, etc.)

Finally, the translation handler translates the INVITE message into instructions, K_DN and K_OFFH, which are transmitted to call processing software module 240 in steps 720 and 722 respectively. The K_DN message indicates to call processing software module 240 what telephone directory number is being called, while the K-OFFH message requests that call processing software module 240 ring the legacy telephone corresponding to the directory number being sent.

In step 724 call processing software module 240 rings legacy telephone 120.

In step 726 call processing software module 340 transmits a TS_RINGBACK message to SIP task module 320 to indicate that call processing software module 240 is ringing legacy telephone 120. In step 728 SIP task module 320 transmits a TS-RINGBACK message to translator dialog A 704.

In step 730 translator dialog A 704 invokes a translation handler that translates the TS_RINGBACK message to a 180_Ringing SIP message. The 180_RINGING message is then passed along to SIP dialog A 702, which in turn transmits the message to SIP endpoint 140.

In step 732 legacy telephone 120 answers. In step 734 legacy telephone 120 transmits an offhook signal to call processing software module 240. In step 736 call processing software module 240 transmits a RING_OFF message to legacy telephone 120 to turn ringing off.

In step 738 call processing software module 240 transmits a TS_VOICE message to SIP task module 320 to indicate that legacy telephone 120 is available and desires to be connected to SIP endpoint 140. In step 740 SIP task module 320 transmits the TS_VOICE message to translator dialog A 740.

In step 742 translator dialog A 740 invokes a translation handler that translates the TS_VOICE message to a 200_OK SIP message. The 200_OK SIP message is transmitted to SIP dialog A 702. Additionally, the translation handler generates a GW_Connect message, which is transmitted to media channel interface 340. Upon receipt of the GW_Connect message, media channel interface 340 requests that channel manager 260 connect the media gateway channel that had been reserved in step 720 to couple the legacy telephone 120 circuit to the SIP endpoint 140 IP channel.

In step 746 SIP dialog A 702 receives an ACK SIP message from SIP endpoint 140. SIP dialog A 702 transmits the ACK message to SIP task module 320. In step 748 SIP task module 320 returns an ACK message to translator dialog A 704. In step 750 call connection is completed and the call is connected between SIP endpoint 140 and legacy telephone 120.

Figure 7B:
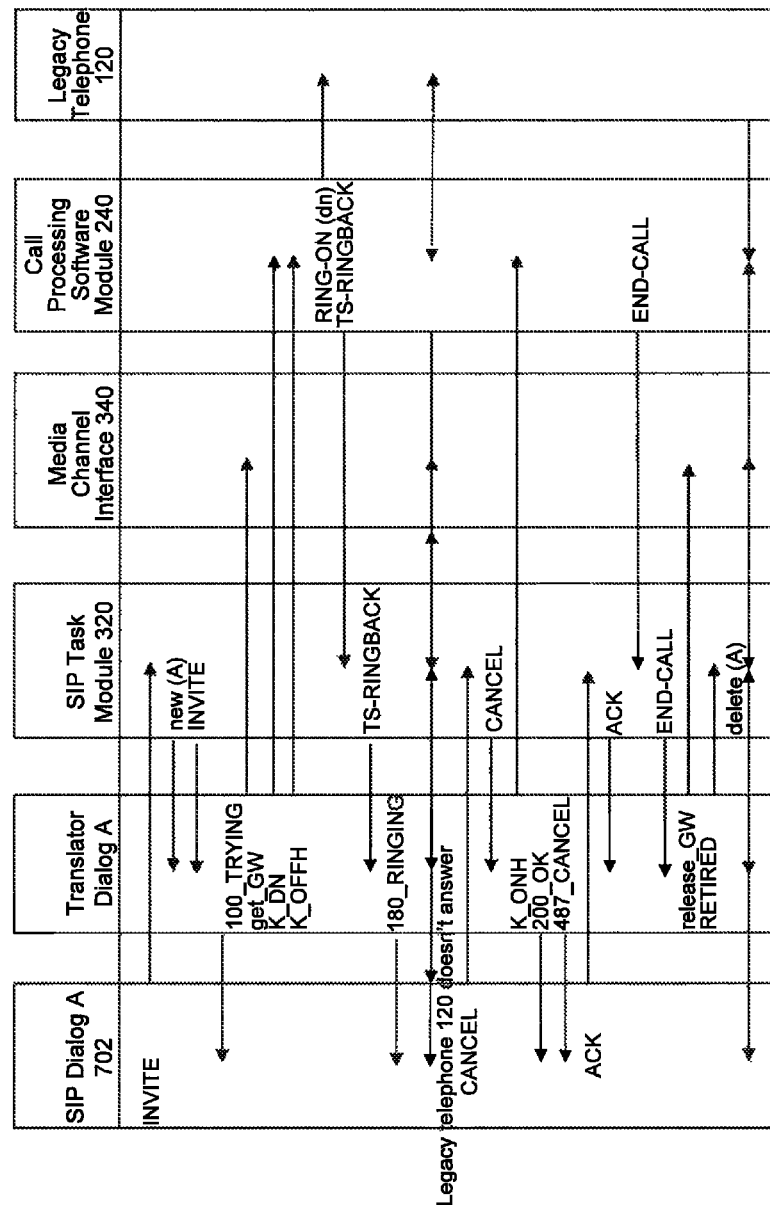
FIG. 7B is a call flow diagram for a call placed by a SIP endpoint to a legacy telephone when there is no answer by the legacy telephone, according to an embodiment of the invention.
Figure 7C:
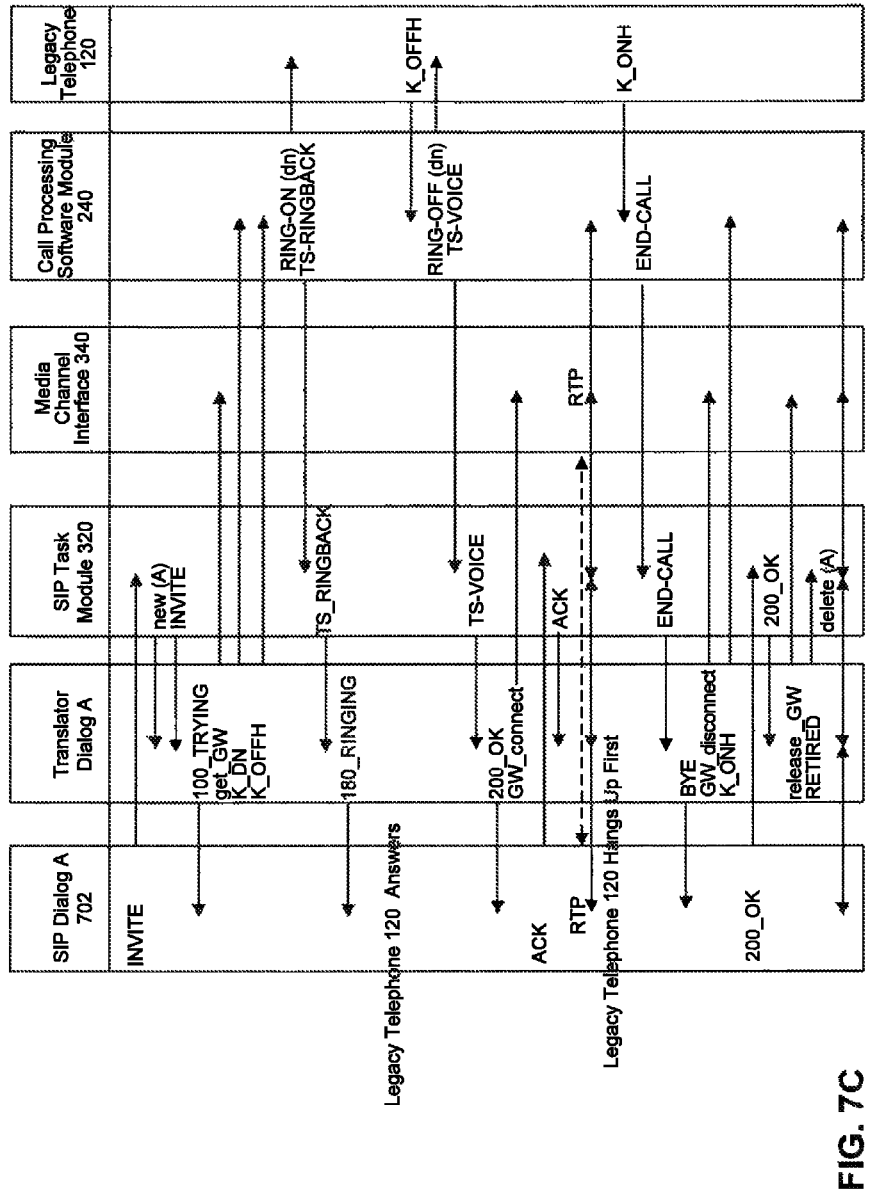
FIG. 7C is a call flow diagram for a call placed by a SIP endpoint to a legacy telephone when the call is completed and the legacy telephone hangs up first, according to an embodiment of the invention.
Figure 7D:
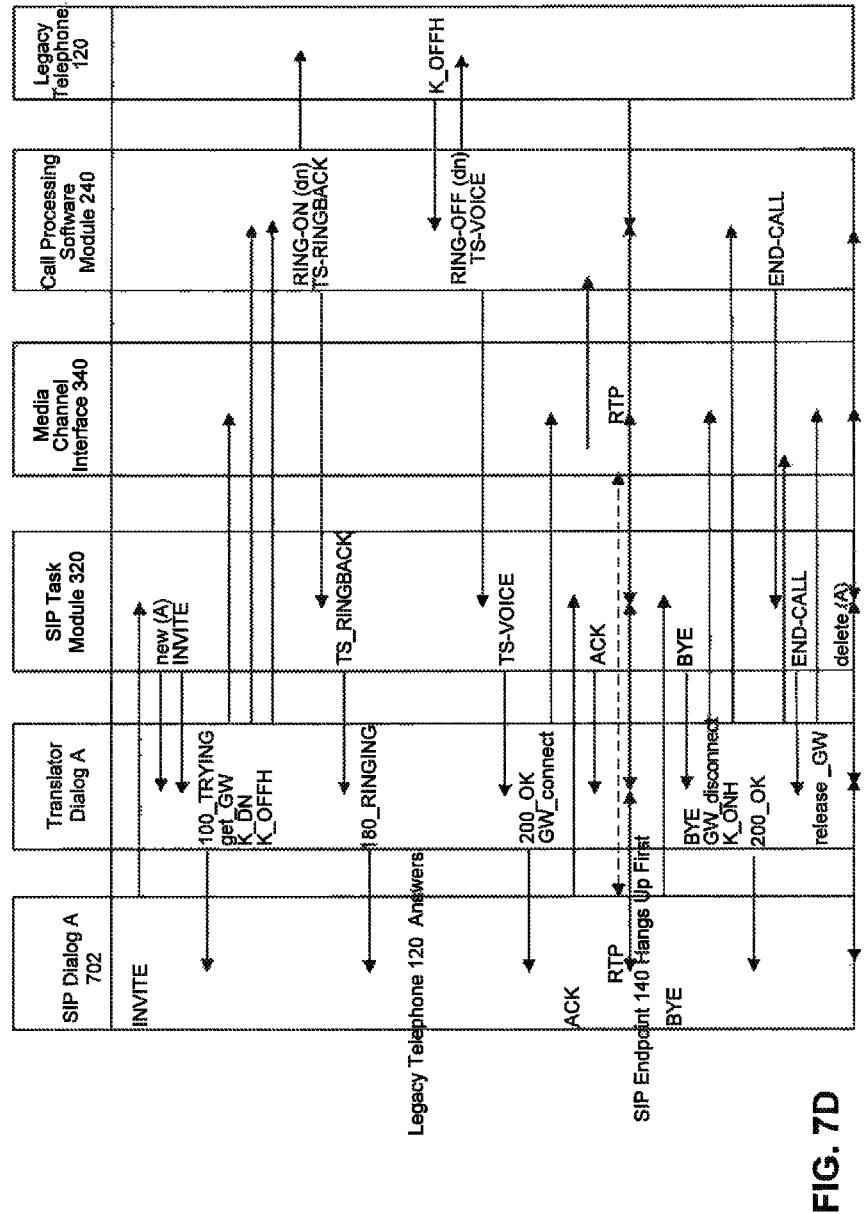
FIG. 7D is a call flow diagram for a call placed by a SIP endpoint to a legacy telephone when the call is completed and the SIP endpoint hangs up first, according to an embodiment of the invention.
Figure 7E:
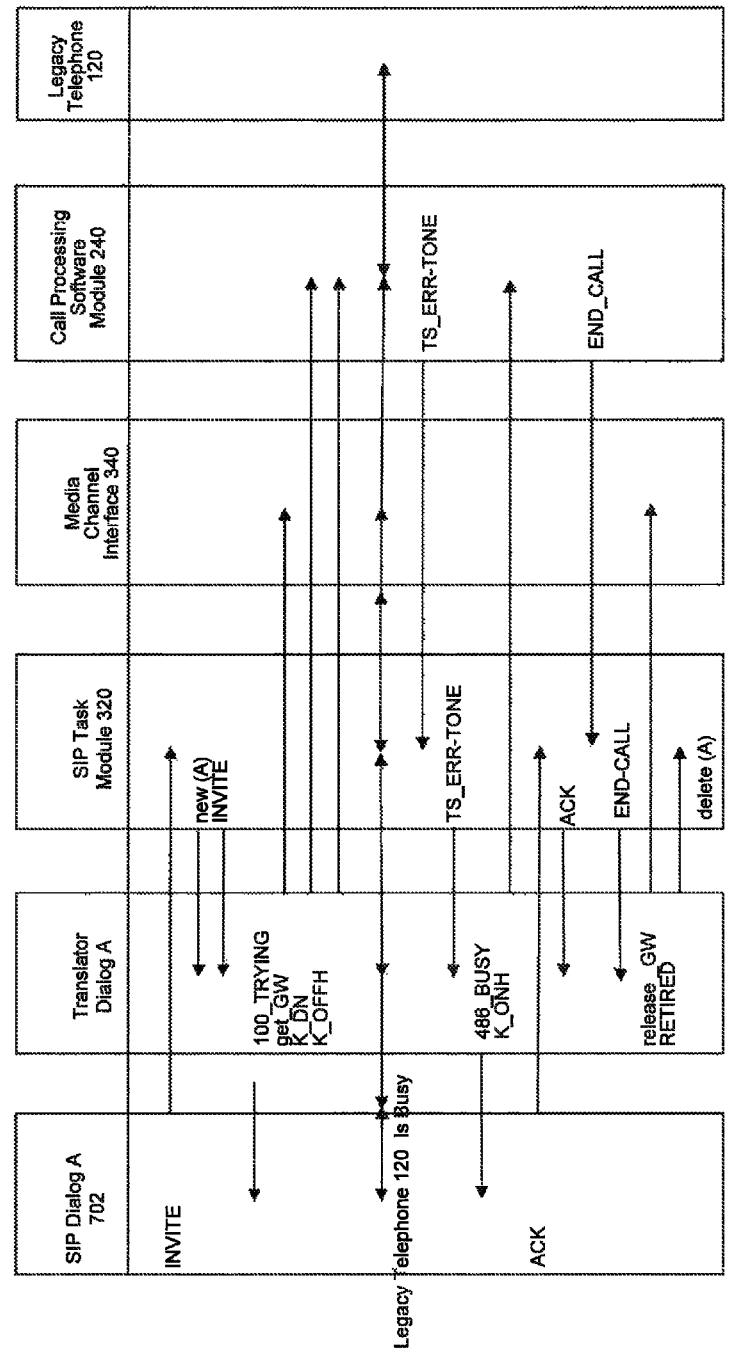
FIG. 7E is a call flow diagram for a call placed by a SIP endpoint to a legacy telephone when legacy telephone 120 is busy, according to an embodiment of the invention.

FIGS. 7B through 7E provide different call scenarios when SIP endpoint 140 is attempting to place a call to legacy telephone 120, according to embodiments of the invention. In particular, FIG. 7B provides a call flow diagram for the call scenario when there is no answer by legacy telephone 120. FIG. 7C provides a call flow diagram for the call scenario when the call is completed and legacy telephone 120 hangs up first. FIG. 7D provides a call flow diagram for the call scenario when the call is completed and SIP endpoint 140 hangs up first. FIG. 7E provides a call flow diagram for the call scenario when legacy telephone 120 is busy.

Figure 8:
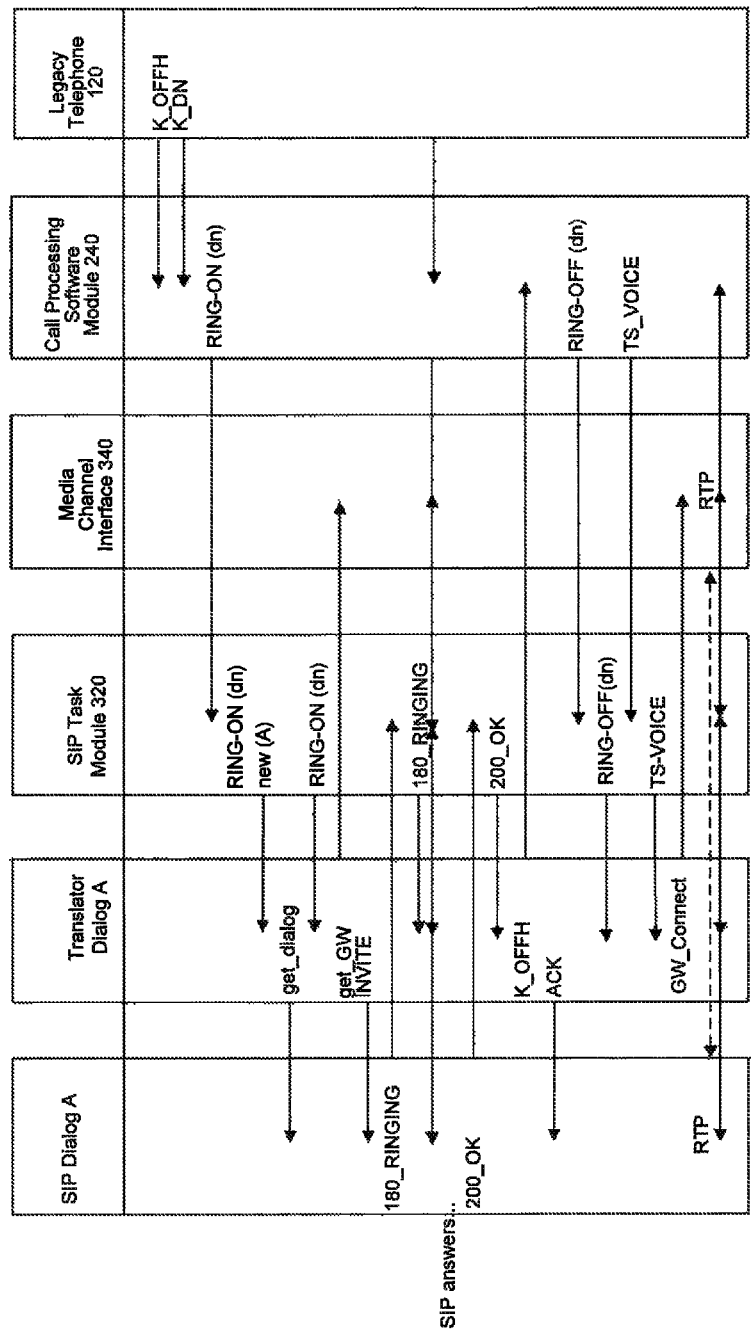
FIG. 8 is a call flow diagram for a call placed by a legacy telephone to a SIP endpoint, according to an embodiment of the invention.

FIG. 8 provides a call flow diagram for the call scenario when legacy telephone 120 is placing a call to SIP endpoint 140, according to an embodiment of the invention.

Figure 9:
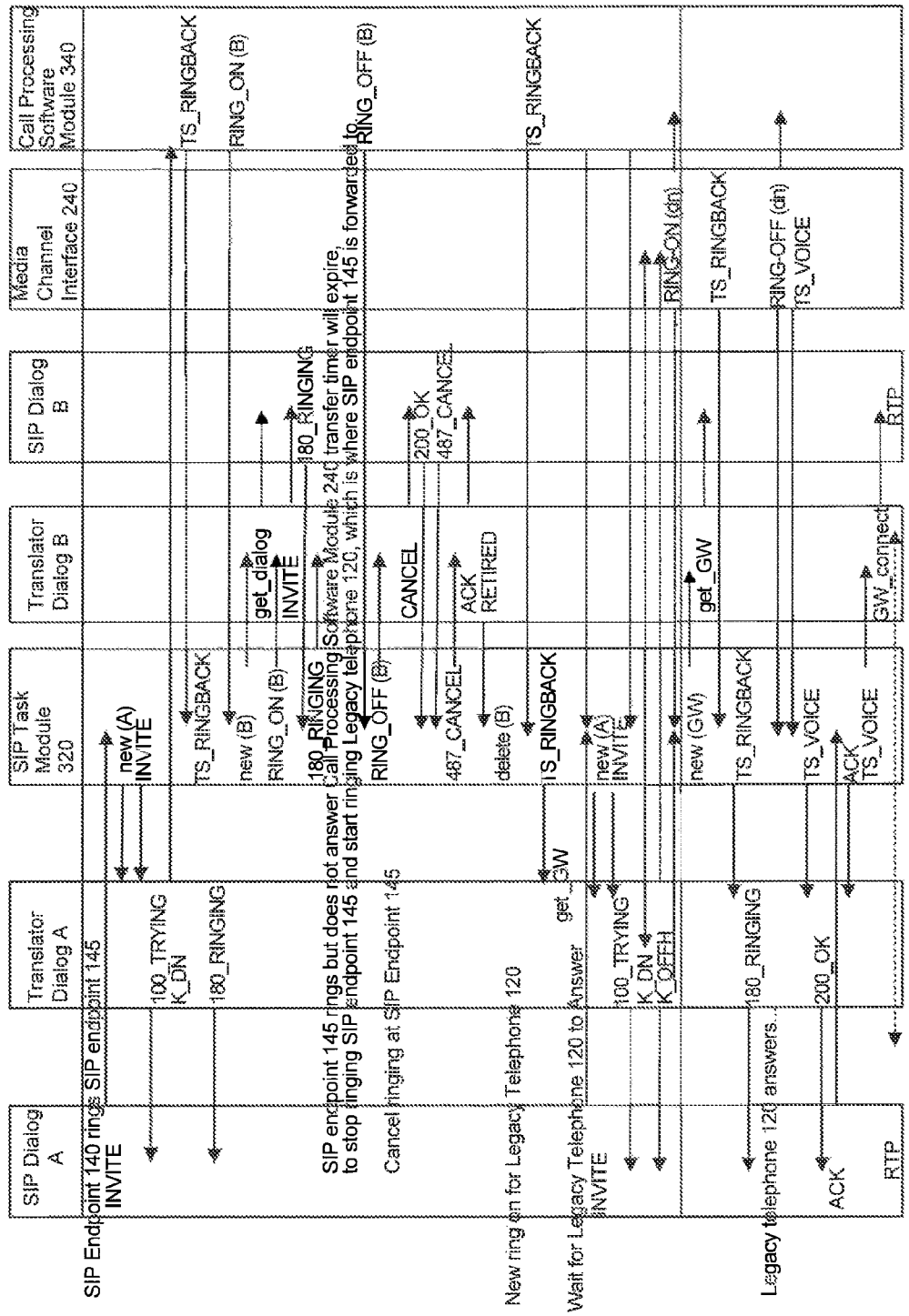
FIG. 9 is a call flow diagram for a call placed by a SIP endpoint to another SIP endpoint and the call is forwarded to a legacy telephone, according to an embodiment of the invention.

FIG. 9 provides a call flow diagram for the call scenario when SIP endpoint 140 places a call to SIP endpoint 150 and the call is forwarded to legacy telephone 120, according to an embodiment of the invention. This call scenario illustrates how multiple SIP and translator dialogs are established.

Figure 10:
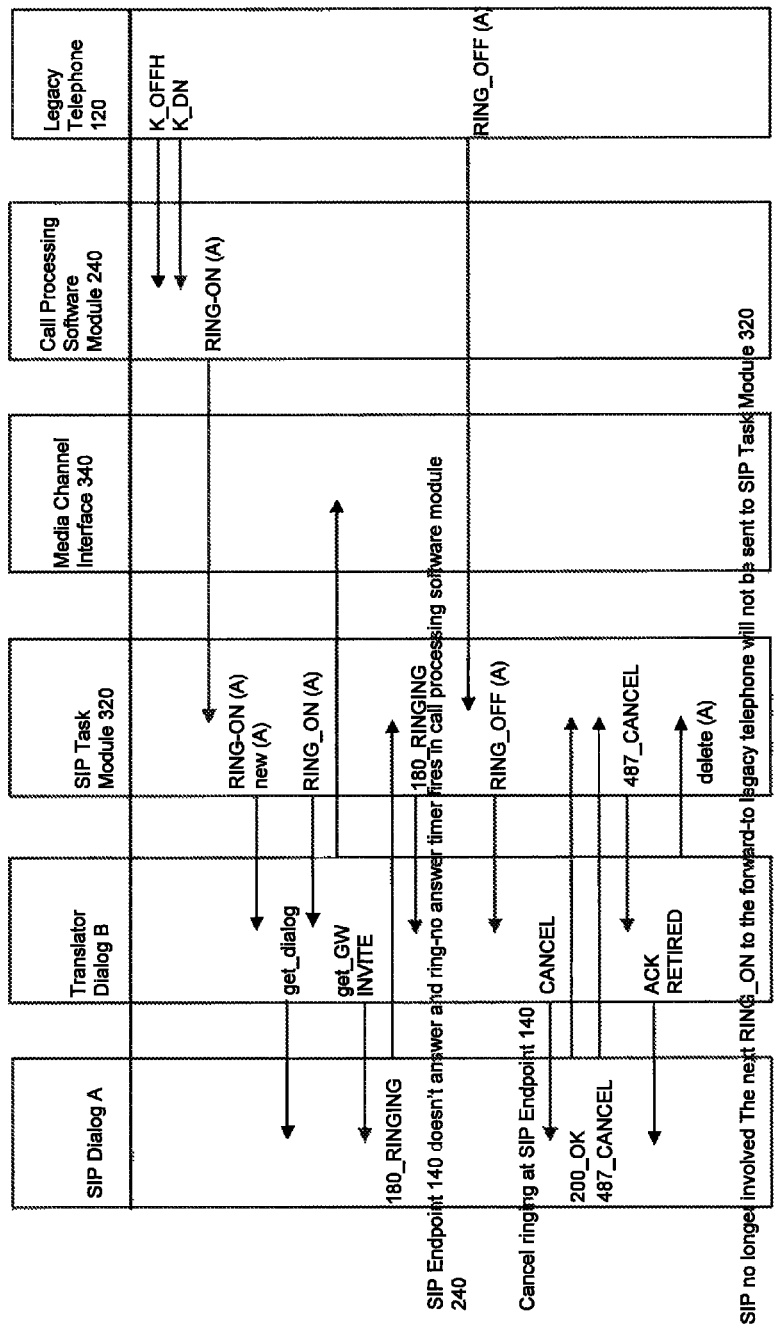
FIG. 10 is a call flow diagram for a call placed by a legacy telephone to a SIP endpoint and the call is forwarded to another legacy telephone, according to an embodiment of the invention.

FIG. 10 provides a call flow diagram for the call scenario when legacy telephone 120 places a call to SIP endpoint 140 and the call is forwarded to another legacy telephone, according to an embodiment of the invention. This call scenario illustrates that when SIP endpoints are no longer involved with a call, SIP task module 320 is no longer used.

Figure 11:
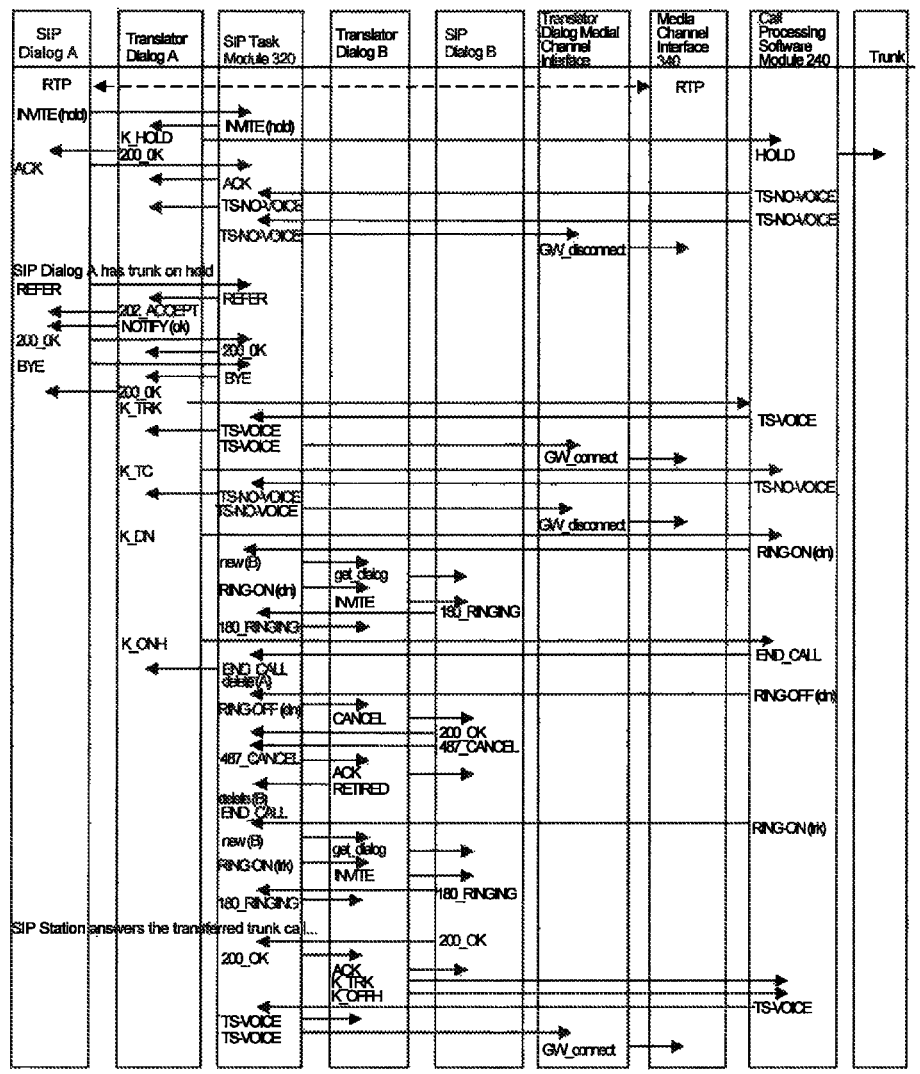
FIG. 11 is a call flow diagram for a SIP endpoint to trunk call, transferred to another SIP endpoint, according to an embodiment of the invention.

FIG. 11 provides a call flow diagram for a SIP endpoint to trunk call, transferred to another SIP endpoint, according to an embodiment of the invention. This example shows how the present invention can be used to transfer calls. In the FIG, the call flow begins with a SIP line already connected to a trunk via a media gateway channel. This is indicated by the dashed arrows with RTP indicated on each side of the areas.

The example call flow diagrams illustrated in FIGS. 7A-10 are exemplary and not intended to limit the scope of the invention. Based on these call flow diagrams, individuals skilled in the relevant arts will be able to develop additional call flow diagrams to support other services, features and call setup scenarios. Additionally, while the examples are limited to calls between SIP endpoints and legacy telephones, other types of calls can be included, including those involving connection to trunk circuits.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A communications network element, comprising:
   a call processing software module configured to provide telephone call processing and services; and
   a session initiation protocol (SIP) translator configured to translate a first SIP message to a first instruction recognizable by said call processing software module and to translate a second instruction from said call processing software module to a second SIP message,
   wherein said SIP translator comprises:
      a SIP dialog module configured to establish a SIP dialog object, representing said SIP endpoint, for a telephone call,
      a translator dialog module configured to translate said second SIP message and said second instruction from said call processing software module and to establish a translator dialog object, representing said SIP endpoint, for said telephone call, and
      a SIP task module configured to cause said SIP dialog module to establish said SIP dialog object upon receipt of said first SIP message or said second instruction and to dispatch an event relating to said telephone call between said call processing software module and said SIP dialog module,
   wherein said SIP dialog object and said translator dialog object are configured to remain open for a duration of said telephone call.

2. The communications network element of claim 1, further comprising:
   a SIP stack configured to queue said first or said second SIP messages.

3. The communications network element of claim 1, further comprising:
   a channel manager configured to allocate a media gateway channel from among a plurality of media gateway channels within said communications network element to couple a SIP endpoint channel to a legacy telephone circuit.

4. The communications network element of claim 1, further comprising at least one of:
   a multi-frequency, dual-tone multi-frequency, integrated digital services network, or a signaling system 7 interface.

5. The communications network element of claim 1, wherein said communications network element is an end office switch, a public branch exchange switch, a gateway switch, or a soft switch.

6. The communications network element of claim 1, wherein said SIP task module is further configured to exchange said first SIP and said second SIP messages within said SIP translator.

7. The communications network element of claim 1, further comprising:
   a media channel interface, coupled to said translator dialog module, configured to allocate a media gateway channel, from among a plurality of media gateway channels, that is used to connect two or more endpoints comprised of SIP endpoints or legacy telephone circuits, wherein at least one endpoint from among said two or more endpoints is a SIP endpoint.

8. The communications network element of claim 1, wherein said translator dialog module further comprises:
   a translation handler configured to translate said first SIP message to said first instruction that is provided to said call processing software module to implement a call feature or a service.

9. The communications network element of claim 8, wherein said first SIP message comprises:
   an INVITE message, and wherein said first instruction comprises:
   a directory number indication message and an offhook request message.

10. The communications network element of claim 8, wherein said second SIP message comprises:
    a BYE message, and wherein said second instruction comprises:
    an onhook request message.

11. The communications network element of claim 8, wherein said translation handler is configured to determine a SIP response message based on said first SIP message.

12. The communications network element of claim 1, wherein said translator dialog module further comprises:
    a translation handler configured to translate said first instruction to said second SIP message.

13. The communications network element of claim 12, wherein said first instruction comprises:
    a request to contact a SIP endpoint, and wherein said first SIP message comprises:
    an INVITE message.

14. A session initiation protocol (SIP) translator for use within a communications network element having a call processing software module that provides call processing and services, said SIP translator comprising:
- a SIP dialog module configured to receive a first SIP message from a SIP endpoint and to create a SIP dialog object that represents said SIP endpoint, said SIP dialog module being configured to create said SIP dialog object for a telephone call;
- a SIP task module configured to cause said SIP dialog module to establish said SIP dialog object upon receipt of said first SIP message and to dispatch an event relating to said telephone call to said SIP dialog module; and
- a translator dialog module configured to translate a second SIP message and an instruction from said call processing software module and to create a translator dialog object,
- wherein said SIP dialog object and said translator dialog object are configured to remain open for a duration of said telephone call.

15. The SIP translator of claim 14, further comprising:
- a media channel interface, coupled to said translator dialog module, configured to allocate a media gateway channel, from among a plurality of media gateway channels, that is used to connect two or more endpoints comprised of SIP endpoints or legacy telephone circuits, wherein at least one endpoint from among said two or more endpoints is said SIP endpoint.

16. The SIP translator of claim 14, wherein said translator dialog module further comprises:
- a translation handler configured to translate said first SIP message to a second instruction that is provided to said call processing software module to implement a call feature or service.

17. During processing of a telephone call, a method to process session initiation protocol (SIP) messages received by a communications network element having a call processing software module that provides call processing and services, the method comprising:
- receiving a SIP message;
- establishing a SIP dialog object and a translator dialog object representing a SIP endpoint for said telephone call upon receipt of said SIP message and remaining open for a duration of said telephone call;
- dispatching an event relating to said telephone call between said call processing software module and said SIP endpoint;
- translating said SIP message to an instruction for said call processing software module; and
- transmitting said instruction to said call processing software module.

18. The method of claim 17, further comprising:
- determining a response SIP message; and
- transmitting said response SIP message.

19. The method of claim 17, further comprising:
- establishing SIP and translator dialogs when said SIP message is an INVITE message.

20. During processing of a telephone call, a method to process instructions generated by a call processing software module that provides call processing and services in a communications network element when a connection to a Session Initiation Protocol (SIP) endpoint is involved, the method comprising:
- receiving an instruction from said call processing software module;
- establishing a SIP dialog object and a translator dialog object representing said SIP endpoint for said telephone call upon receipt of said instruction and remaining open for a duration of said telephone call;
- dispatching an event relating to said telephone call between said call processing software module and said SIP endpoint;
- identifying a call state;
- translating said instruction to a SIP message; and
- transmitting said SIP message to said SIP endpoint.

21. The method of claim 20, further comprising:
- determining a response instruction to said call processing software module; and
- transmitting said response instruction.

22. In a communications network element used to connect legacy telephones with Session Initiation Protocol (SIP) endpoints, a method to couple a legacy telephone circuit to a SIP endpoint channel, comprising:
- receiving an indication that a media gateway channel needs to be established between said SIP endpoint channel and said legacy telephone circuit;
- reserving said media gateway channel;
- establishing that said SIP endpoint channel and said legacy telephone circuit are available to be connected and desire to be connected;
- establishing a SIP dialog object and a translator dialog object representing said SIP endpoint channel upon said establishment of said SIP endpoint channel and said legacy telephone circuit being available to be connected and remaining open for a duration of a telephone call;
- dispatching an event relating to said telephone call between said SIP endpoint channel and said SIP legacy telephone circuit; and
- connecting said media gateway channel to couple said SIP endpoint channel and said legacy telephone circuit.

23. The communications network element of claim 1, wherein said communications network element comprises a private branch exchange (PBX).

24. A non-transitory computer readable medium having instructions stored thereon, execution of which by a computing device cause said computing device to perform operations comprising:
- receiving a session initiation protocol (SIP) message;
- establishing a SIP dialog object and a translator dialog object representing a SIP endpoint for a telephone call upon receipt of said SIP message and remaining open for a duration of said telephone call;
- dispatching an event relating to said telephone call between a call processing software module and said SIP endpoint;
- translating said SIP message to an instruction; and
- transmitting said instruction.

25. A non-transitory computer readable medium having instructions stored thereon, execution of which by a computing device cause the computing device to perform operations comprising:
- receiving an indication that a media gateway channel needs to be established between a session initiation protocol (SIP) endpoint channel and a legacy telephone circuit;
- reserving said media gateway channel;
- establishing that said SIP endpoint channel and said legacy telephone circuit are available to be connected and desire to be connected;
- establishing a SIP dialog object and a translator dialog object representing said SIP endpoint channel upon said establishment of said SIP endpoint channel and said legacy telephone circuit being available to be connected and remaining open for a duration of a telephone call;

dispatching an event relating to said telephone call between said SIP endpoint channel and said SIP legacy telephone circuit; and connecting said media gateway channel to couple said SIP endpoint channel and said legacy telephone circuit.

26. A private branch exchange (PBX), comprising:

means for providing telephone call processing and services;

means for translating a first session initiation protocol (SIP) message to a first instruction;

means for translating a second instruction to a second SIP message;

means for establishing a SIP dialog object and a translator dialog object upon receipt of said first SIP message that represent a particular SIP endpoint and for remaining open for a duration of a telephone call; and means for dispatching an event relating to said telephone call.

* * * * *